(12) United States Patent
Saisan

(10) Patent No.: US 8,437,556 B1
(45) Date of Patent: May 7, 2013

(54) SHAPE-BASED OBJECT DETECTION AND LOCALIZATION SYSTEM

(75) Inventor: Payam Saisan, San Diego, CA (US)

(73) Assignee: HRL Laboratories, LLC, Malibu, CA (US)

( * ) Notice: Subject to any disclaimer, the term of this patent is extended or adjusted under 35 U.S.C. 154(b) by 810 days.

(21) Appl. No.: 12/589,483

(22) Filed: Oct. 21, 2009

Related U.S. Application Data

(63) Continuation-in-part of application No. 12/072,697, filed on Feb. 26, 2008, now Pat. No. 8,116,575.

(51) Int. Cl.
*G06K 9/62* (2006.01)
*G06K 9/00* (2006.01)
*G06K 9/48* (2006.01)

(52) U.S. Cl.
USPC .............................. 382/224; 382/103; 382/199

(58) Field of Classification Search .................. 382/103, 382/199, 209, 224, 100
See application file for complete search history.

(56) References Cited

U.S. PATENT DOCUMENTS

| | | | |
|---|---|---|---|
| 6,741,655 B1 * | 5/2004 | Chang et al. | 375/240.26 |
| 6,876,322 B2 * | 4/2005 | Keller | 342/22 |
| 7,492,303 B1 * | 2/2009 | Levitan et al. | 342/22 |
| 2003/0072484 A1 * | 4/2003 | Kokko et al. | 382/155 |
| 2004/0151378 A1 * | 8/2004 | Williams | 382/199 |
| 2005/0031183 A1 | 2/2005 | Wrigglesworth et al. | |
| 2005/0276443 A1 | 12/2005 | Slamani et al. | |
| 2007/0118324 A1 * | 5/2007 | Gulati | 702/131 |
| 2007/0235652 A1 * | 10/2007 | Smith | 250/363.02 |
| 2008/0144885 A1 * | 6/2008 | Zucherman et al. | 382/103 |
| 2009/0297039 A1 * | 12/2009 | Reinpoldt et al. | 382/209 |

OTHER PUBLICATIONS

D.M. Sheen, et al., "Concealed explosive detection on personnel using a wideband holographinc millimeter-wave imaging system," in Proc. SPIE Aerosp./Defense Sens. Contr., vol. 2755, 1996, pp. 503-513.

P. Perona, et al., "Scale-Space and Edge detection using anisotropic diffusion," IEEE Transactions on Pattern Analysis and Machine Intelligence, vol. 12, No. 7, pp. 629-639, 1990.

\* cited by examiner

*Primary Examiner* — Daniel Mariam
(74) *Attorney, Agent, or Firm* — Tope McKay & Associates

(57) ABSTRACT

Described is a system for identifying a concealed object of interest. The system is initialized by receiving an image in grayscale. The image is processed image to identify feature rich regions, which are identified as a binary mask describing edge pixels and non-edge pixels. A set of edge pixels are then randomly sampled. An object detector function is then used on the set of edge pixels to determine if an object of interest is present in the set of edge pixels.

12 Claims, 11 Drawing Sheets

SHAPE-BASED OBJECT DETECTION AND LOCALIZATION SYSTEM

PRIORITY CLAIM

The present application is a Continuation-in-Part application, claiming the benefit of priority of U.S. patent application Ser. No. 12/072,697, filed on Feb. 26, 2008, entitled, "System for anomaly detection using sub-space analysis."

FIELD OF INVENTION

The present invention relates to an object detection and localization system and, more particularly, to a system that localizes and detects an object based on the shape of the object.

BACKGROUND OF INVENTION

The security industry is in need of technological innovation for producing automated image analysis systems for detecting concealed objects underneath a person's clothing. As shown in FIG. 1, existing imaging modalities include a visible image 100, a millimeter wave image (mmW) 102, and backscatter X-ray image 104. The objective in such a system is to automate the process so that a human operator is not required to look at raw data. However, as shown, a visible image 100 does not identify concealed objects. Alternatively, raw scans (such as the mmW 102 and backscatter X-ray 104 images) reveal what is underneath the clothing, which is the naked appearance of subjects. In the current state of technology, human operators have to directly inspect the scans displaying human subjects essentially in a naked form. As such, these systems generate concerns in the public over privacy issues. Another example of such a raw scan is depicted in FIG. 2, which illustrates a frontal image 200 and a rear image 202 of a subject.

In almost all the existing mmW and backscatter X-ray scanning systems, the task of image inspection and analysis of the image content for the presence of concealed objects (e.g., weapons) is carried out manually by human operators. Although some attempts are being made at automating the process by device manufacturers such as Rapiscan Systems Inc. and Trex Enterprises Corporation, no fully automated system currently exists that can scan and reliably analyze two-dimensional (2D) image content for the presence of concealed objects. Rapiscan Systems Inc. is located at 2805 Columbia Street Torrance, Calif. 90503. Trex Enterprises Corporation is located at 10455 Pacific Center Court, San Diego, Calif. 92121.

Additionally, several recent patent applications have been filed that reveal a number of object detection related systems devised within the context of medical imaging. The focus of related prior art on anomaly detection in the context of medical imaging is often on feature based anomalous/cancerous cell detection. For example, U.S. patent application Ser. No. 10/633,815, by Wrigglesworth et al., describes a system for detecting anomalous targets, namely cancerous cells. In this particular paradigm, a predefined number of features are extracted from a particular set of cell imagery. The features are then used to generate a probabilistic belief function to determine a probability that at least some of the cells in an image set are anomalous.

As another example, U.S. Pat. No. 7,072,435, issued to Metz et al., describes a system that processes computer tomography scans for detecting anomalous cancerous cells associated with lung cancer. The novelty in this particular patent is the use of CT imaging modality, while the algorithms for determining anomalies are somewhat standard computer aided detection (classification) methods.

As yet another example, U.S. patent application Ser. No. 10/352,867, by Parker et al., describes a system in which segmentation and localization of biomarkers, such as liver metastases and brain lesions, are cast as an anomaly detection problem. Statistical segmentation methods are used to identify biomarkers in the first image and the process is carried over to several subsequent images that are time evolutions of the biological construct (liver or brain tissue) that is under observation. The method relies on processing temporal sequences of three-dimensional medical imagery (instead of two-dimensional views).

The prior art is limited for these particular types of imagery. The limitation is primarily due to availability and the need for use of such scanning modalities for security purposes in the public domain. Prior art largely remains in the medical imaging domain where the task of anomaly detection is posed as identification of cancerous lesions. In the mmW and backscatter X-ray image analysis domain, device manufacturers have made attempts at bringing together a combination of off-the-shelf algorithms to analyze images for weapon detection, yet a reliable system does not currently exist that is able to detect weapons in such scans. The existing methods are often not tailored to the specific nature of the data.

A literature and patent search on prior art has revealed related work, particularly in the area of medical imaging; however, as indicated herein, the methods used pose significant vulnerabilities to geometric deformations, image appearance variations and partial occlusions. Addressing these issues is important in creating a reliable automated detection system.

Thus, a continuing need exists for a system that uses an analysis and detection technique to automatically identify concealed objects without manual intervention

SUMMARY OF INVENTION

The present invention relates to a computer implemented method for identifying a concealed object of interest. The method comprises an act of causing a computer (having a processor and a memory module encoded with instruction means that are executable by the processor) to execute the instruction means and cause the processor to perform a plurality of acts (operations). Such acts include receiving an image in grayscale and processing the image to identify feature rich regions which are identified as a binary mask describing edge pixels and non-edge pixels. A set of edge pixels are then randomly sampled. Finally, an object detector function is used on the set of edge pixels to determine if an object of interest is present in the set of edge pixels.

In processing the image, all edges in the image are identified using an edge detector, which results in a binary image. The binary mask is constrained using a threshold to describe edge pixels and non-edge pixels as a binary, two-class classification.

In determining if an object of interest is present in the set of edge pixels, a region of interest window is cropped out that is centered around a selected edge pixel. An edge preserving non-linear diffusion is then performed on the region of interest window to increase saliency of edges of a potential object of interest. A background and a foreground are thereafter formed in the region of interest window. The background is segmented from the foreground, with pixel information extracted for the foreground (the pixel information having dimensional coordinates for each pixel in the foreground). Two best fit ellipsoids are fit to the pixel information (each ellipsoid having a major and minor axis). The two best fit ellipsoids are fit to the pixel information such that there exists an intersection between the major axis of the two ellipsoids. The two major axes are then extracted from the two ellipsoids. The two major axes can then be aligned with a known two-axis model representing an object of interest. A distance measurement is then determined between the two major axes and the known two-axis model. Additionally, the object is identified as an object of interest if the distance measurement is below a predetermined threshold.

Finally, the present invention also includes a computer program product and a system. The computer program product comprises computer-readable instruction means stored on a computer-readable medium that are executable by a computer for causing the computer to perform the operations described herein. Additionally, the system includes a processor and memory module that are configured to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
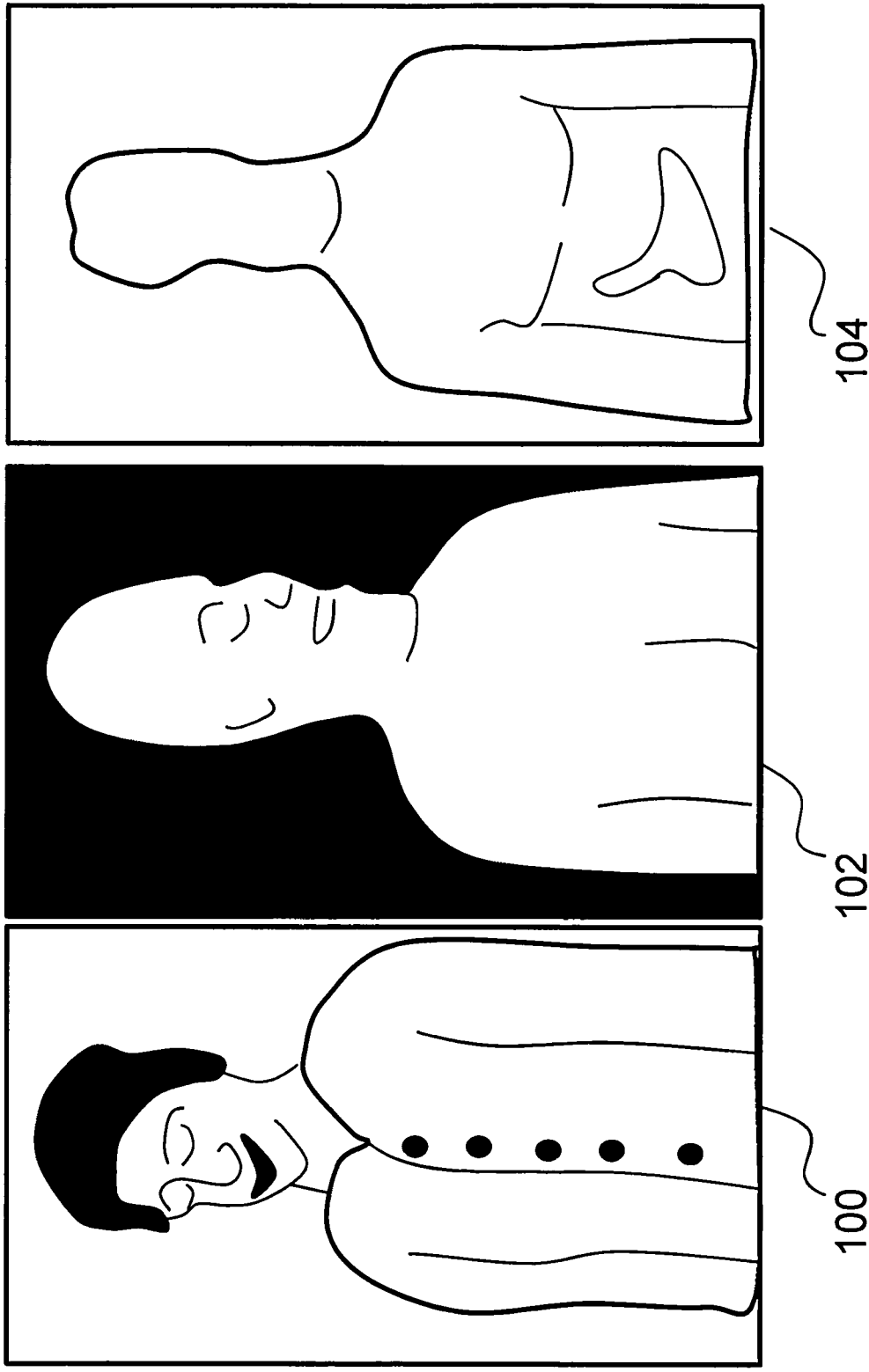
FIG. 1 is an illustration depicting different imaging modalities, including a visible image, millimeter wave, and backscatter X-ray.
Figure 2:
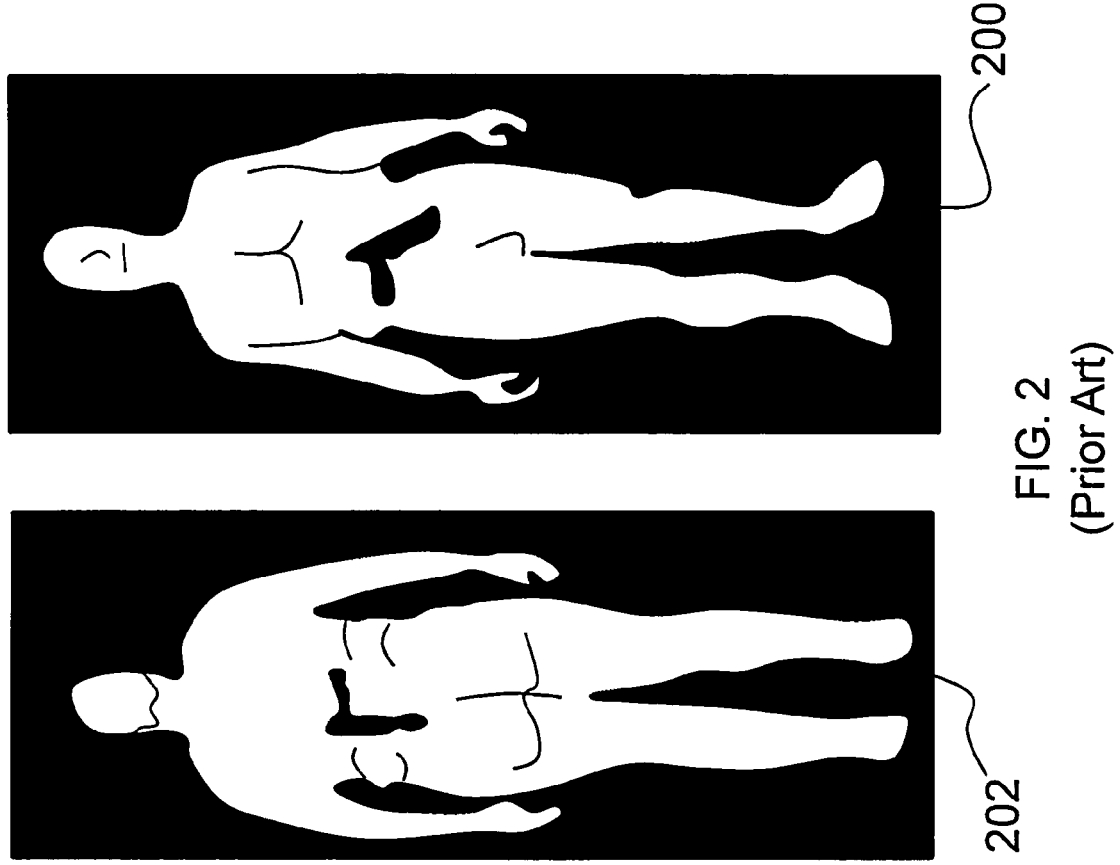
FIG. 2 is an illustration of a typical backscatter X-ray scan image.

The present invention relates to an object detection and localization system and, more particularly, to a system that localizes and detects an object based on the shape of the object. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Next, details of the present invention are provided to give an understanding of the specific aspects. Finally, a brief synopsis of experimental results is provided.

(1) Principal Aspects

The present invention has three "principal" aspects. The first is an object detection and localization system. The object detection and localization system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 3:
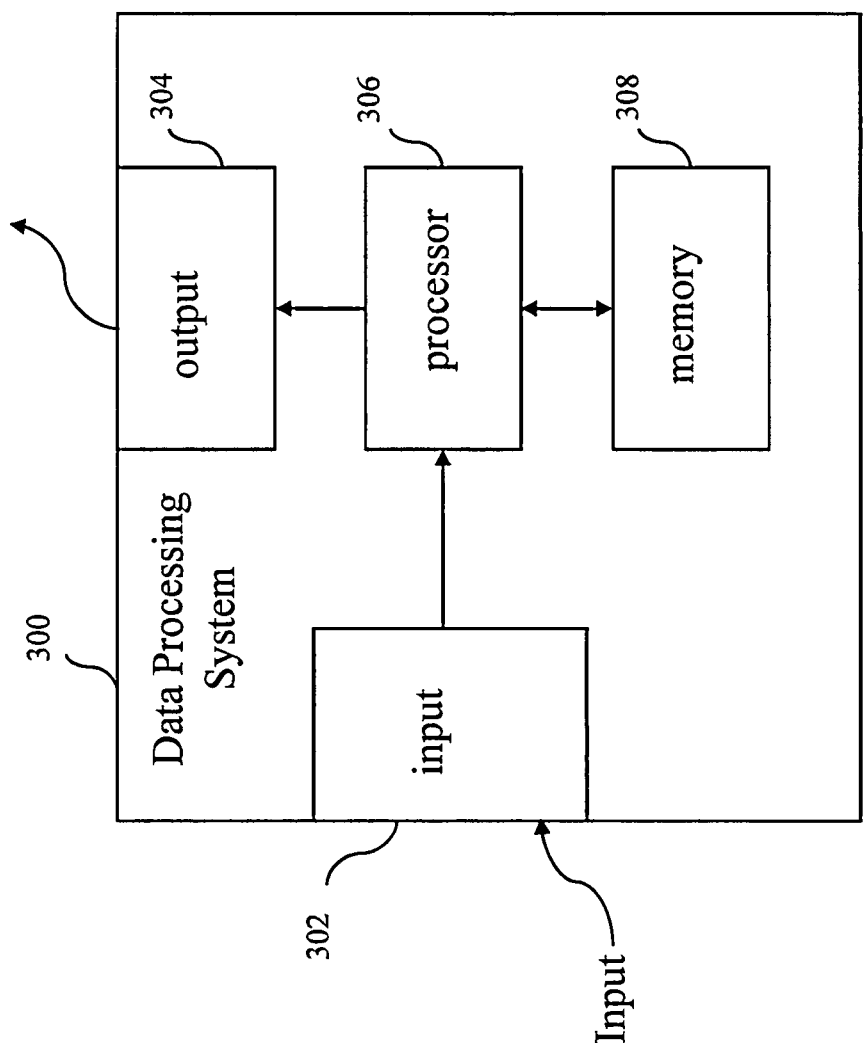
FIG. 3 is a block diagram depicting the components of an image processing system of the present invention.

A block diagram depicting the components of an object detection and localization system of the present invention is provided in FIG. 3. The object detection and localization system 300 comprises an input 302 for receiving information from at least one sensor for use in detecting an object in an image. Note that the input 302 may include multiple "ports." Typically, input is received from at least one sensor, non-limiting examples of which include a video image sensor, a millimeter wave (mmW) scanning device, an infra-red (IR) scanning device, or a backscatter X-ray scanning device. An output 304 is connected with the processor for providing information regarding image (or an anomaly in the image) to other systems in order that a network of computer systems may serve as an anomaly detection system. Output may also be provided to other devices or other programs; e.g., to other software modules, for use therein. The input 302 and the output 304 are both coupled with a processor 306, which may be a general-purpose computer processor or a specialized processor designed specifically for use with the present invention. The processor 306 is coupled with a memory 308 to permit storage of data and software that are to be manipulated by commands to the processor 306.

Figure 4:
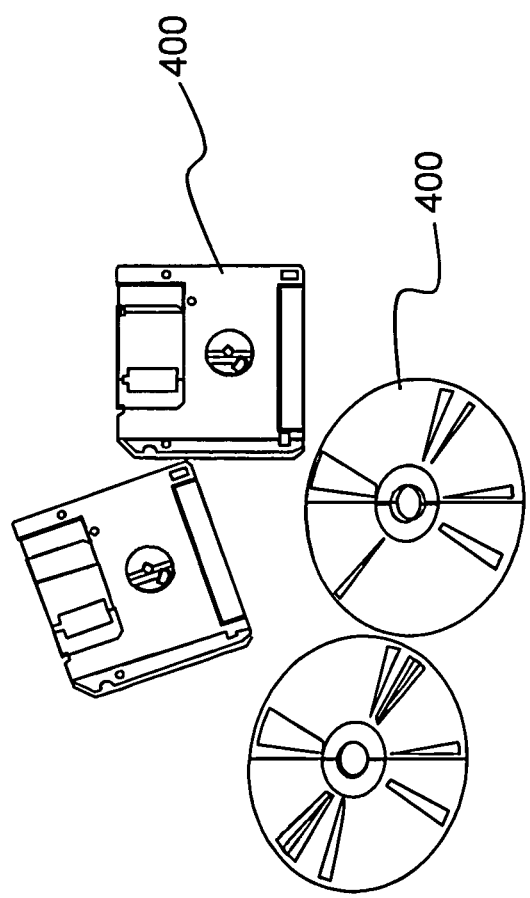
FIG. 4 is a computer program product embodying the present invention.

An illustrative diagram of a computer program product embodying the present invention is depicted in FIG. 4. The computer program product 400 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

(2) Introduction

Imaging technology to detect objects hidden underneath layers of clothing is a recent and rapidly developing field. Backscatter X-ray scanning devices have been in use for some time in prisons for scanning inmates for the presence of concealed weapons. More recently, millimeter wave (mmW)-based imaging devices are being developed with the same intent by a number of companies. However, such devices are unmarketable for use in the public domain due to privacy issues involved in the nature of scans (scans reveal humans in naked form).

Addressing the need for privacy, the present invention can be used to analyze such scans automatically for the presence of objects (such as weapons), eliminating the need for inspection of scans by a human operator. Such systems can be deployed in airports and elsewhere where there is a need for inspection of subjects for the presence of concealed objects.

The present invention improves upon the prior art by providing a shape-based object detection and localization technique for computer aided analysis of images. The present invention is capable of automatic analysis of two-dimensional (2D) images of human scans produced using unconventional imaging modalities, such as millimeter wave (mmW), infra-red (IR) or backscatter X-ray scanning devices. A goal of the present invention is to detect and localize weapons or weapon-like conspicuous objects that may be concealed underneath layers of clothing. The present invention learns key appearance elements (models) for specific objects, such as guns or knives. After learning the models, the present invention can search and locate new instances of the object in novel images with an extended measure of robustness to background and geometric distortions (both local and global) that may be due to object's orientation, viewing angle or partial occlusions.

The present invention detects and localizes an object using four primary elements:
a. Model learning;
b. Image preprocessing;
c. Shape extraction; and
d. A normalized metric in the space of shapes of certain geometric topology.

Combined, the elements of the present invention can be used to analyze an image for the presence of particular objects. More specifically, the present invention can be applied to mmW or backscatter X-ray images to identify and localize the presence of a variety of concealed objects.

(3) Details of the Invention

Figure 5A:
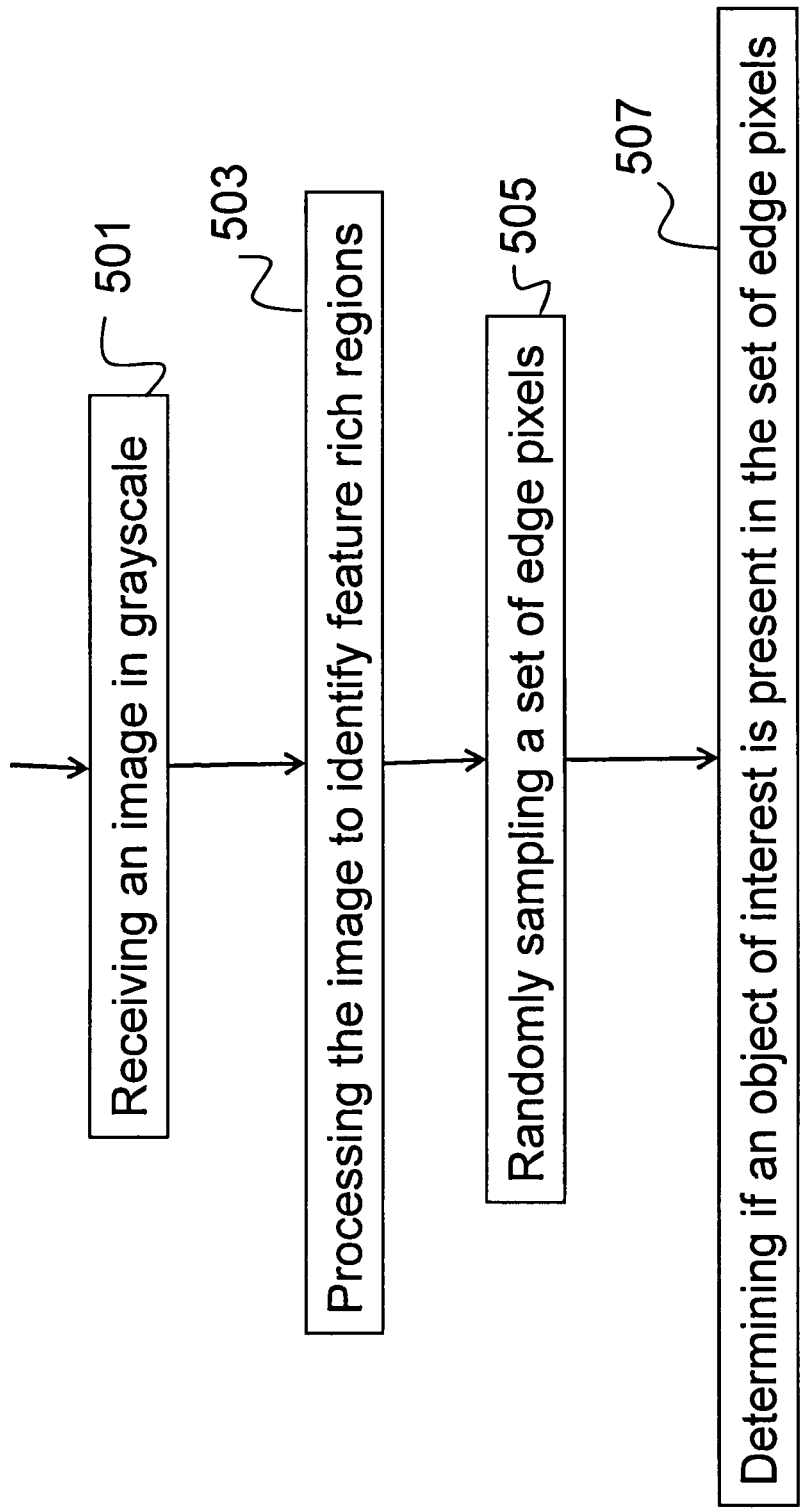
FIG. 5A is a flowchart illustrating a process for shape-based object detection according to the present invention.
Figure 5B:
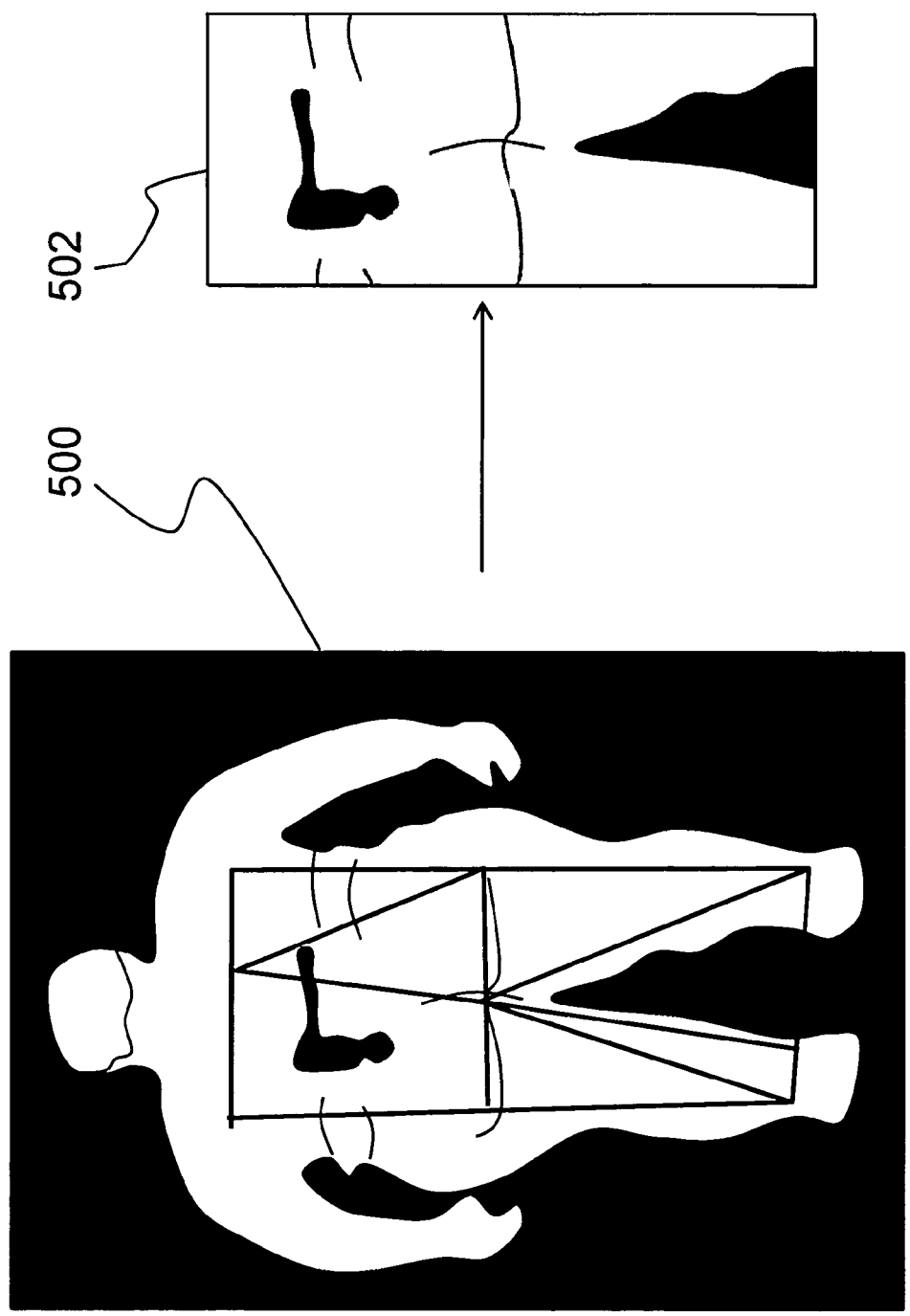
FIG. 5B is an illustration depicting a registration stage.

As noted above, the present invention is a system for shape-based object detection. Generally speaking and as illustrated in FIG. 5A, the present invention operates by receiving an image in grayscale 501, processing the image to identify feature rich regions 503 (which are identified as a binary mask describing edge pixels and non-edge pixels), randomly sampling a set of edge pixels 505, and determining if an object of interest is present in the set of edge pixels 507.

In operation, the present invention relies on learning a model for a specific object. The model is used later to search in images for objects with similar appearance characteristics.

There are several components that comprise the core technique of the present invention. The components are:
a. Model learning;
b. Image preprocessing;
c. Shape extraction; and
d. A normalized metric in the space of shapes of certain geometric topology. For clarity, each of the components will be described in turn.

(3.1) Model Learning

Before detecting an object, the system must learn a model of the object's (e.g., weapon) appearance and then analyze image patches against the model. The system uses a local window that analyzes rectangular regions of the image for the presence of objects. Building models of objects that can be used to robustly and reliably perform classification and localization tasks is an active area of research in computer vision and pattern recognition. The present invention draws upon the latest findings in these areas.

The first stage of model learning includes a body shape registration mechanism. As show in FIG. 5A, the registration stage brings the body scan 500, using manually annotated landmarks points, normalized (e.g., using piecewise affine warping) to a reference frame 502 (e.g., a reference frame that is a 512 pixel by 256 pixel rectangular image grid). The registration in preliminary experiments were carried out manually; however, it is worth noting that automatic registration of the human body scan can be done using the geometric registration tools developed by the medical imaging community. Shape registration is an important area of focus in medical imaging community and powerful computational methods have been devised. For example, a non-limiting example of such a shape registration tool was described by Duta et al., in "Automatic Construction of 2D Shape Models," *IEEE Transactions on Pattern Analysis and Machine Intelligence*, volume 23, issue 5, pages 433-446, May 2001.

(3.2) Image Preprocessing

Figure 6:
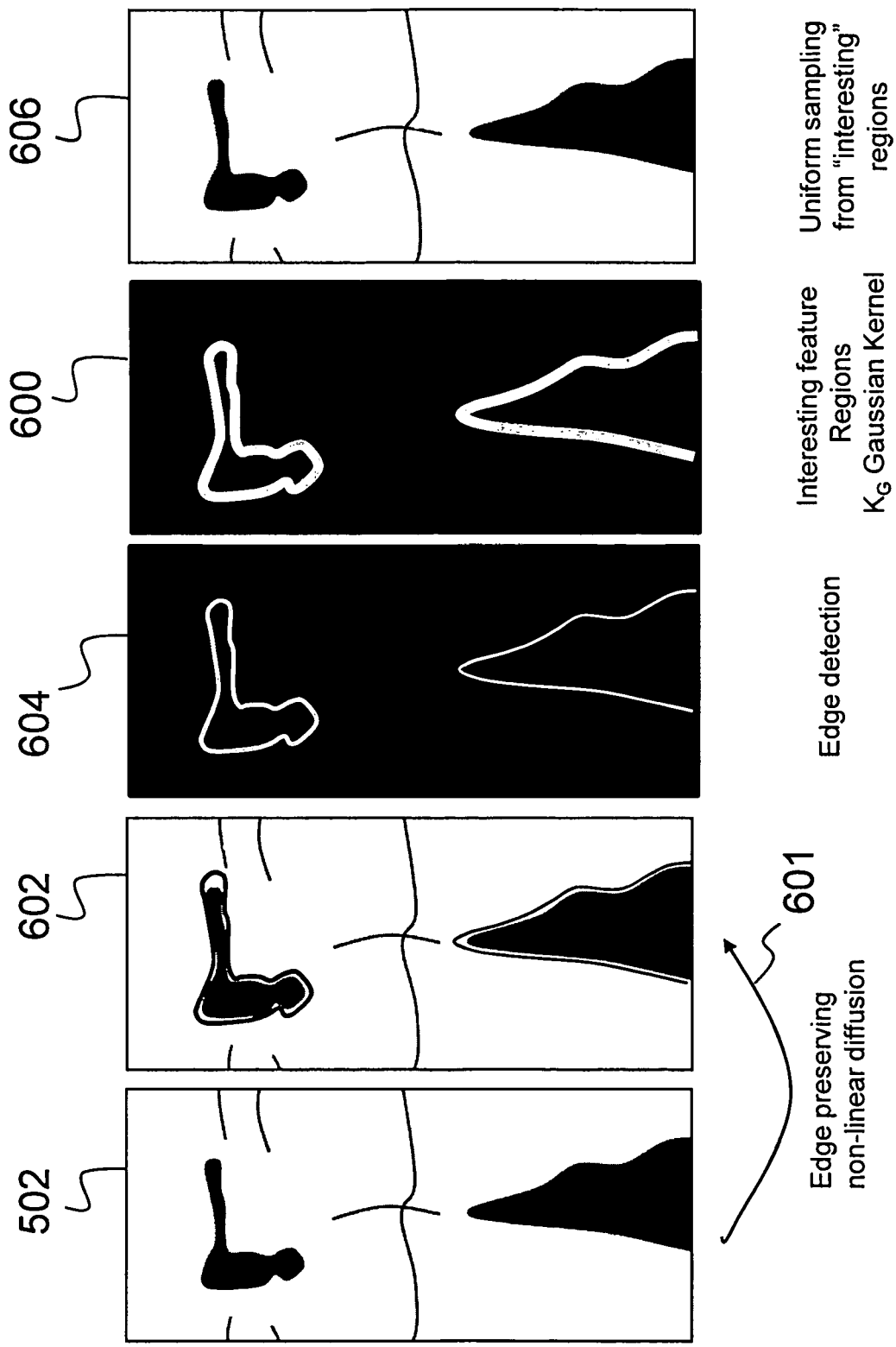
FIG. 6 is a series of images depicting preprocessing stages for identifying feature rich regions.

After receiving an image in grayscale, the second stage (as shown in FIG. 6) is preprocessing of the image where interesting, feature rich regions of the image are identified as a binary mask describing edge pixels and non-edge pixels. Typically, scans of the human body reveal a uniformly bright appearance with relatively low gradient features. The presence of objects is marked by high gradient texture rich regions. The term high gradient texture rich regions refers to regions in the image in which there are several instances of quick blending of colors from low to high color values (or vice versa) across the region. A low gradient region would be a region where there is a casual blend of color across the region. In contrast, a high gradient region is a region where there is a quick or dramatic blend of color across the region. If there are numerous instances of dramatic or quick color blends, this is indicative of a feature rich region. It is, therefore, reasonable to focus on feature rich regions that will form the search space for object detection analysis later.

In the present invention, feature rich regions are identified as a binary mask 600 describing edge pixels and non-edge pixels. The mask 600 is primarily used to reduce the search space for processing and search by the object detection operator. The object detection operator is essentially an image operator $\Phi(I_O)$ that operates on a rectangular patch $I_O$ and returns an object score that is indicative of the patch containing a particular object. The object detection operator (function) works on the set of edge pixels to determine if an object of interest is present in the set of edge pixels.

The mask 600 is created by using a reference frame 502 and performing edge preserving nonlinear diffusion 601 on the reference frame 502. Edge preserving nonlinear diffusion is used to improve the accuracy of later segmentation by preserving changes in image intensity to generate an image with enhanced changes 602. Due to United States Patent and Trademark Office (U.S.P.T.O.) rules regarding grayscale drawings, the enhanced changes are depicted as an additional line surrounding the object. However, in operation, the enhanced changes can be sharp contrasting edges that depict the changes in image intensity from grayscale images. Non-limiting examples of techniques for edge preserving nonlinear diffusion include median filtering and gray-scale morphology.

Using an edge detector, edge detection 604 is then performed to identify points in the image at which the image brightness changes sharply or, more formally, has discontinuities. Thus, the edges are identified in the image which results in a binary image. A non-limiting example of a suitable technique for edge detection is Canny Edge Detection, described by Canny, J., in "A Computational Approach to Edge Detection," *IEEE Trans. Pattern Analysis and Machine Intelligence*, Vol. 8, pp. 679-714, 1986.

The binary mask 600 is then created to reduce the search space for processing and search by the object detection operator. A threshold is used to constrain the binary mask 600 to describe edge pixels and non-edge pixels as a binary, two-class classification.

The binary mask 600 is created to identify interesting feature regions using a Gaussian Kernel. Uniform sampling 604 is then performed in the interesting regions that were identified in the mask 600 for use by the object detection operator 700.

(3.3) Shape Extraction

Figure 7:
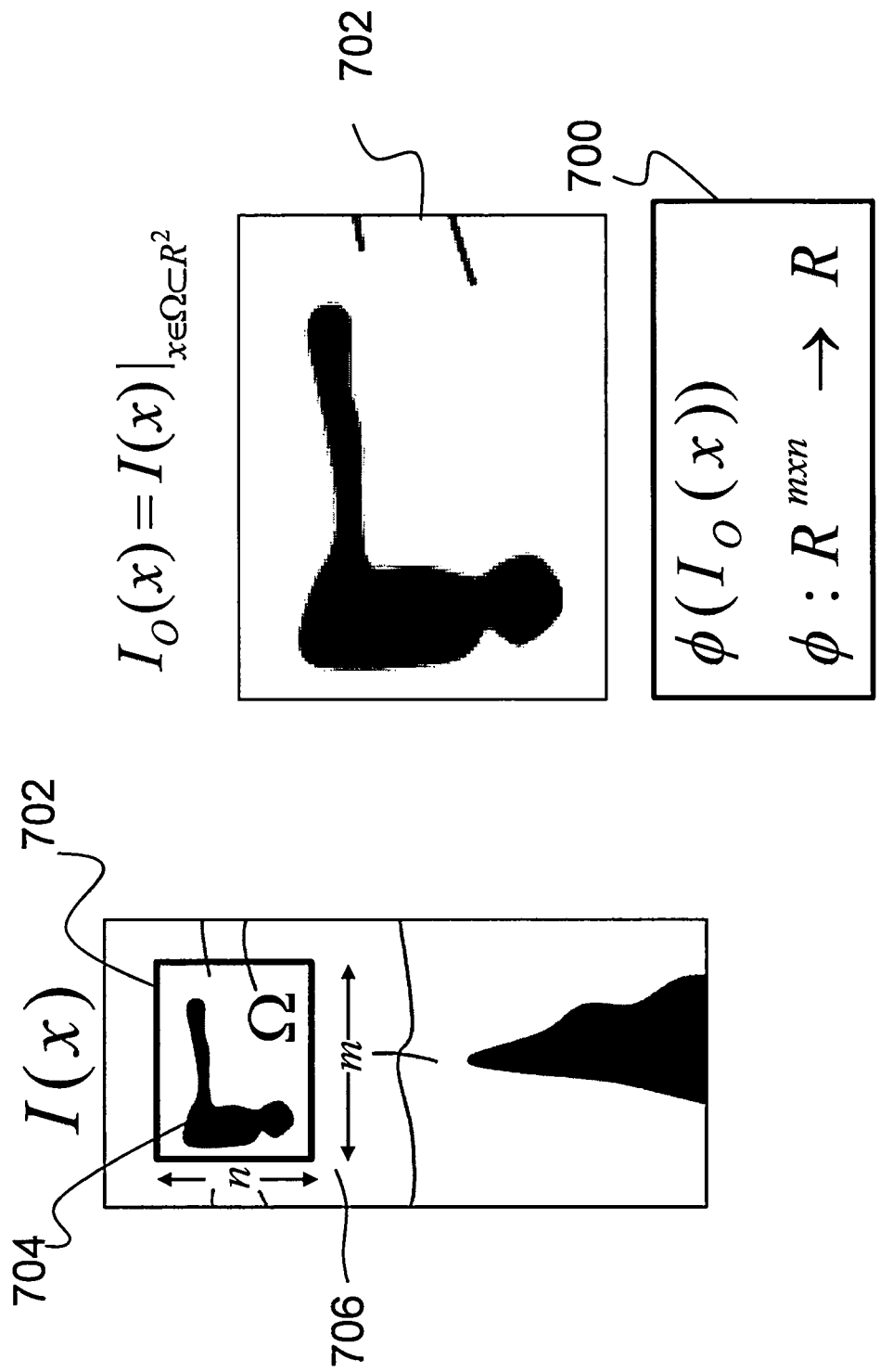
FIG. 7 is an illustration of an object detection operator and corresponding analysis window.

As shown in FIG. 7, an object detection operator 700 is at the heart of the shape-based detection system. The object detection operator 700 itself has several stages. The first stage is the shape extraction. As shown in FIG. 7, a region of interest window $\Omega$ 702, centered around a selected edge pixel $x_c \in R^2$ with dimensions m×n, is cropped out for further use. The window 702 is scanned for interesting points using an object detection operator 700, which can be calculated as follows:

$$\phi(I_O(x))$$

$$\phi: R^{m \times n} \to R$$

where R is a real number, $\phi$ is an image operator, $I_O$ is a rectangular patch in the image, x is one of the pixels in the rectangular patch, while $I_O(x)$ is the rectangular patch of pixels being examined. Additionally, R is the space of Real numbers, while $R^{m \times n}$ is the space of rectangular image pixels of size m×n. The equation provided above is an equation for the object detection operator where the object detection operator examines the m×n window of pixels ($I_0(x)$) and returns a real number. This number reflects how similar the pixels in the rectangular patch are to a known object model.

Thus, the object detection operator window is defined as:

$$I_O(x) = I(x) | x \in \Omega \subset 2$$

where $\in$ means "is an element of" while $\subset$ means "is a subset of."

Initially, an edge preserving nonlinear diffusion process is used to aid the segmentation of the dark 704 (e.g., weapon) regions from the lighter 706 background (e.g., body) regions. A non-limiting example of a suitable edge preserving nonlinear diffusion process was described by Perona et al. in "Scale-Space and Edge Detection Using Anisotropic Diffusion," *IEEE Transactions on Pattern Analysis and Machine Intelligence*, Vol. 12, No. 7, pp. 629-639, 1990.

Figure 8A:
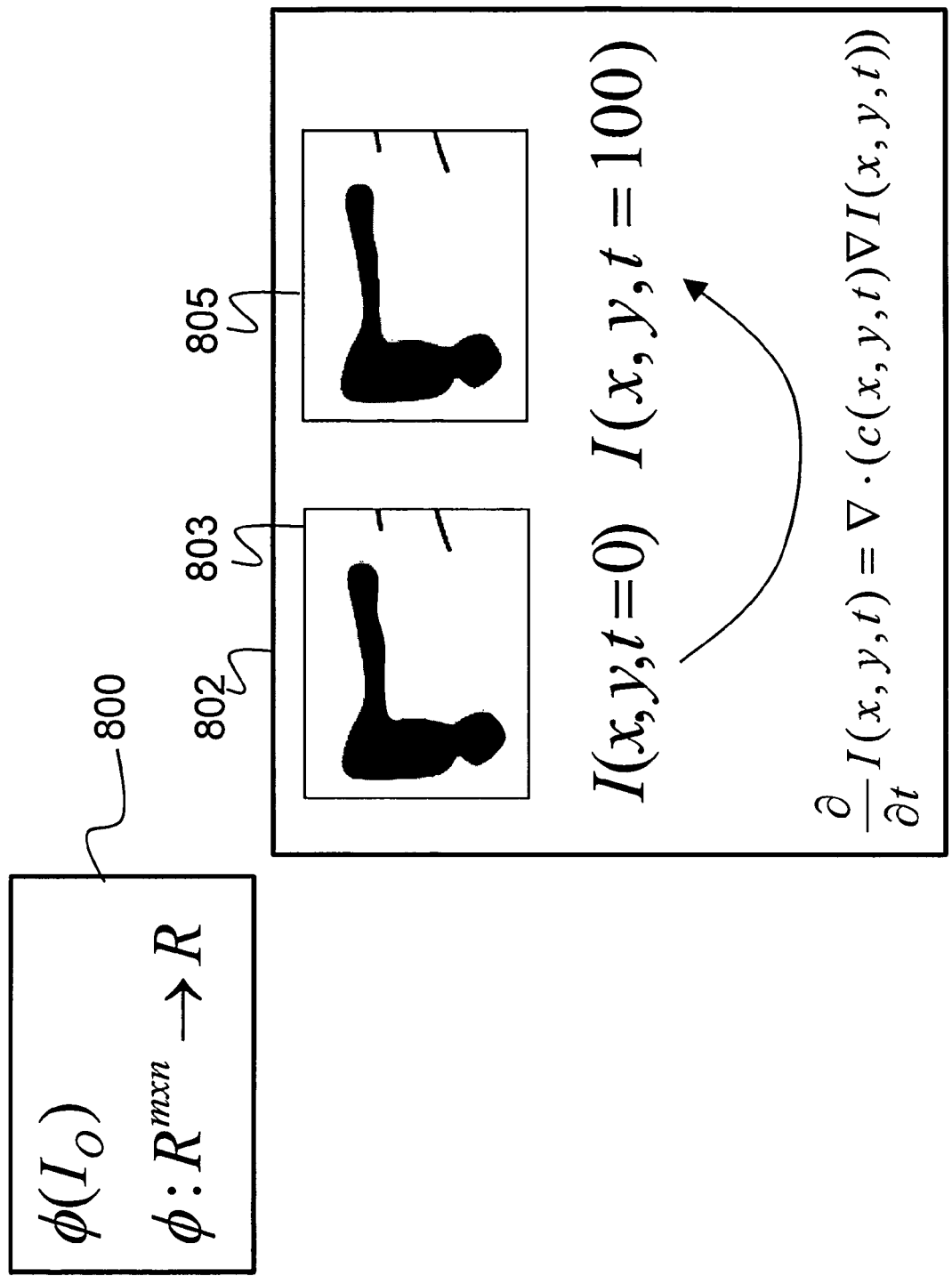
FIG. 8A is an illustration of an object detection operator and edge preserving nonlinear diffusion.
Figure 8B:
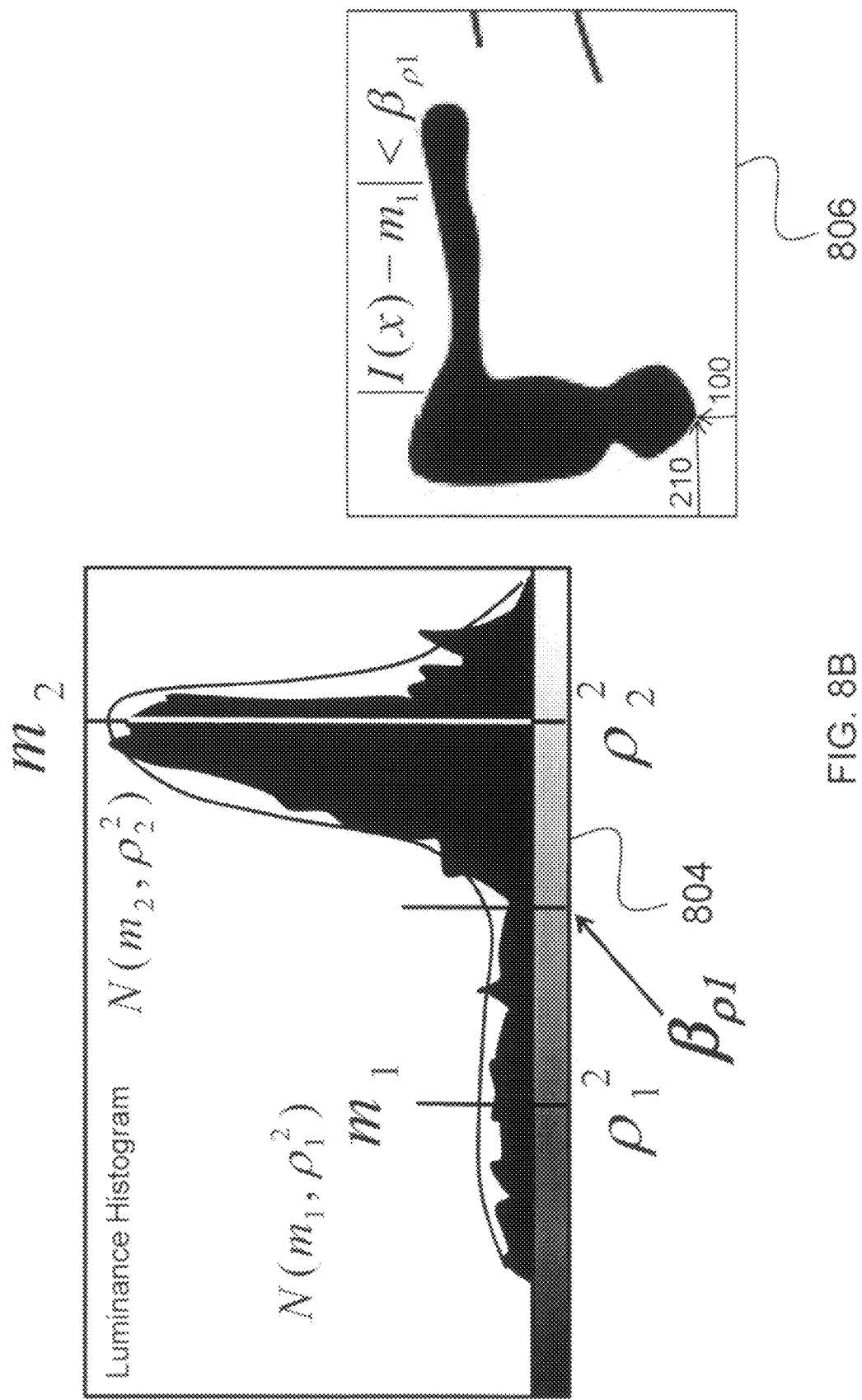
FIG. 8B is an illustration of a luminance histogram and a binary shape image.

As shown in FIGS. 8A and 8B, the goal is to carry out the segmentation while preserving the shape information contained in the darker (or the lighter depending on the imaging modality) region. A two part mixture of Gaussians (maximum likelihood) fit is applied to segment the patch into dark and bright regions. FIG. 8A depicts the object detection operator 800 and edge preserving nonlinear diffusion 802. Edge preserving nonlinear diffusion 802 is performed on the region of interest window 803 to increase saliency of edges of a potential object of interest. Saliency refers to the state of the edges of the potential object of interest to be able to stand out relative to any neighboring item or background scenery. For example, the edge preserving nonlinear diffusion 802 increases the contrast of the edges of the potential object of interest to stand out from surrounding material in the image.

Depicted is the region of interest window with increased saliency 805. Edge preserving nonlinear diffusion 802 can be performed according to the following:

$$\frac{\partial}{\partial t} I(x, y, t) = c(x, y, t)\Delta I(x, y, t) + \nabla c(x, y, t) \cdot \nabla I(x, y, t),$$

where x, y are points in the image, t is time, c is the coefficient of diffusion that, in this formulation, is both space (i.e., image location) and time dependent. Further, $\nabla$ denotes the gradient operator while $\Delta$ is the Laplacian operator. As can be appreciated by one skilled in the art, the Laplacian operator is a second order differential operator in the n-dimensional Euclidean space, defined as the divergence of the gradient $\nabla f$.

Additionally, FIG. 8B depicts a luminance histogram 804 and the resulting binary shape image 806. As understood by one skilled in the art, the luminance histogram 804 is used to show the total tonal distribution in the image and represent the count of pixels of every tone of gray that occurs in the image. The luminance histogram 804 assists a user in determining the how to segment the image patch into dark and bright regions, resulting in the binary shape image 806, in which the test object is segmented from the background.

One procedure to segment the image patch into dark and bright regions is depicted in FIG. 8B. A two part mixture of Gaussians (maximum likelihood) fit is applied to luminance histogram. As shown in 804, the luminance histogram is modeled as the sum of two Gaussians:

$$LH(n) \cong \alpha N(n-m_1, \rho_1^2) + (1-\alpha)N(n-m_2, \rho_2^2),$$

where LH(n) is the luminance histogram at pixel value n and $N(m, \rho)$ is a Gaussian distribution with mean m and variance $\rho^2$. Through analysis of the Gaussian mixture model, the threshold $\beta_{\rho 1}$ is chosen and used to create the binary shape image (806).

A normalized metric in the space of shapes of certain geometric topology is used to determine if an object of interest is present in the set of edge pixels, as follows.

Figure 9:
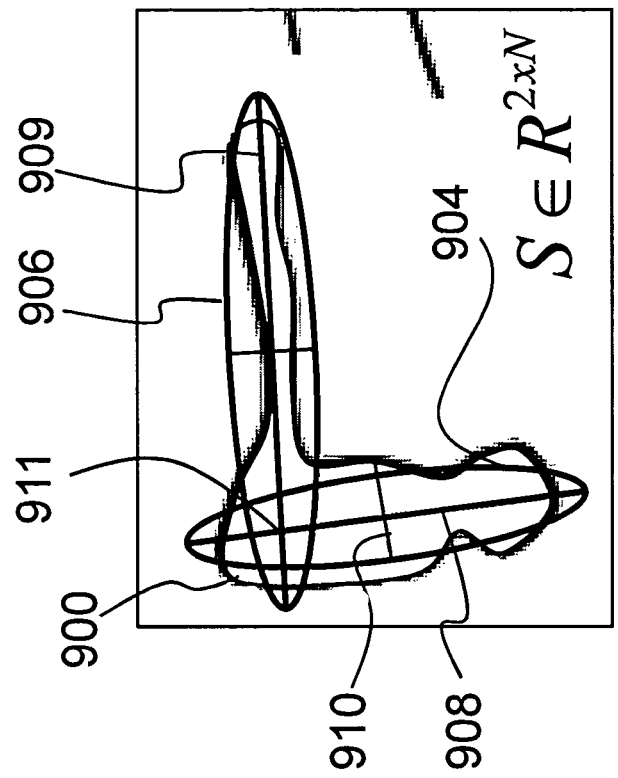
FIG. 9 illustrates a shape extraction stage, where a two-dimensional mixture of Gaussians fit is used to extract a geometric form of a foreground object.
Figure 9:
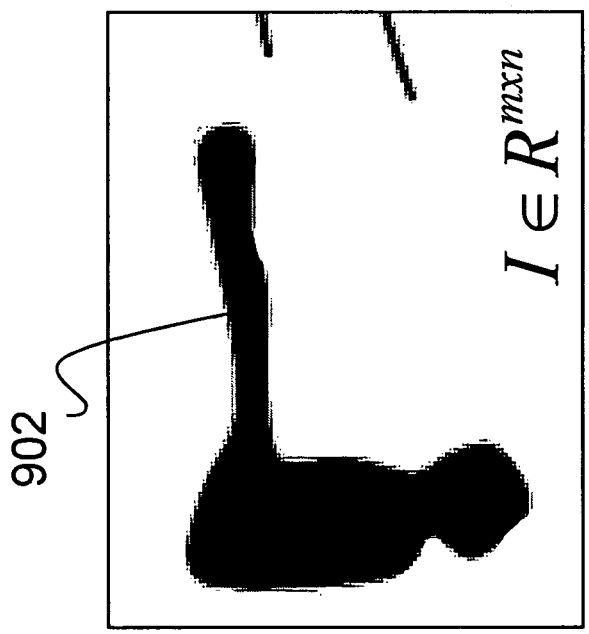

FIG. 9 depicts a shape extraction stage, where a two-dimensional mixture of Gaussians fit is used to extract the principal skeletal structure (i.e., geometric form 900) of the foreground object 902. The foreground object 902 is assumed to contain the object of interest which is defined by pixel information. The geometric form 900 (referred to as shape 5) is defined by two-dimensional point data corresponding to the two major axes of ellipsoids 904 and 906. Thus, pixel information is extracted for the foreground. The pixel information includes dimensional coordinates for each pixel in the foreground. Each ellipsoid 904 and 906 includes a major axis 908 and a minor axis 910. The two best fit ellipsoids 904 and 906 are fit to the pixel information such that there exists an intersection 911 between the major axes 908 and 909 of the two ellipsoids 904 and 906. The two-dimensional, mixture of Gaussians fit is carried out on the foreground patch geometry. Such a procedure was described by Duda, R. O. and Hart, P. E., in *"Pattern Classification and Scene Analysis,"* Wiley (1973), which is incorporated by reference as though fully set forth herein. Thus, after the major axes 908 and 909 are identified, they are extracted for further comparison against the axes corresponding to known objects.

The geometric form 900 of the foreground is then used for comparison against known object shapes (e.g., a hand gun). The major axes 908 and 909 of resulting Gaussians are analyzed and shape registered against known geometric topology of a two-axis shape description of an object. Shape S is registered to known object shape $S_{object}$, according to the following equation:

$$\operatorname*{argmin}_{A} \| S - AS_{object} \|$$

subject to $AA^T = I$ and Procrustes analysis, where A is a matrix used to shape register the axes of the known object ($S_{object}$) to the axes of the test shape (S) and/is the identity matrix. Arg min$\| \, \|$ is an operation that minimizes what is inside the brackets (which in this case is the difference between the shape S and the warped shape $AS_{object}$) by varying the matrix A. Matrix A is a rotation matrix found by least squares analysis. For example, the Procrustes analysis first removes scale and translation invariance prior to determining A and applying it.

Initial topological (line end-point correspondence) alignment is resolved through minimizing the Hausdorff distance between end points and intersection 911 of the two primary axes 908 and 909. Thus, the two major axes 908 and 909 are aligned with a known two-axis model representing an object of interest.

Given correct end point correspondences, shape registration is achieved through Procrustes alignment. This is a key step in removing geometric deformations from the shape, bringing it to a normalized shape reference frame. Such a procedure was described by G. H. Golub and C. F. in *"Van Loan. Matrix Computations,"* Johns Hopkins University Press, 1996, which is incorporated by reference as though fully set forth herein.

Once the extracted shape is registered and normalized, the Euclidean distance between registered sampling of a predetermined number of points (e.g., 100) on the reference and target shapes is computed. Thus, a distance measurement is determined between the two major axes and the known two-axis model. This distance is ultimately used as the basis for object detection. The object is identified as an object of interest if the distance measurement is below a predetermined threshold. An object detection score can be calculated according to the following equation:

$$\Phi = \| S - AS_{object} \|_F = \sum_N \| S_i - AS_{i\_object} \|_2$$

where $\Phi$ is the object detection score, N is the number of sampled points used in calculating the score, i and i_object are indices (that go from 1 to N) of corresponding sample points in the test shape (S) and known object ($S_{object}$), and F is the set of points that make up S and $S_{object}$.

Thus, in essence, the object detection operator includes two stages, the shape extraction stage and the shape distance stage, summarized as follows:

$$I \in R^{m \times n} \xrightarrow{Shape.Extraction} S \in R^{2 \times N} \xrightarrow{Shape.Distance} \Phi \in R.$$

What is claimed is:

1. A computer implemented method for identifying a concealed object of interest, comprising an act of causing a computer having a processor and a memory module encoded with instruction means that are executable by the processor to execute the instruction means and cause the processor to perform acts of:
   receiving an image in grayscale;
   processing the image to identify feature rich regions which are identified as a binary mask describing edge pixels and non-edge pixels;
   randomly sampling a set of edge pixels; and
   determining if an object of interest is present in the set of edge pixels.

2. A method as set forth in claim 1, wherein the act of processing the image further comprises acts of:
   identifying all edges in the image using an edge detector, which results in a binary image; and
   using a threshold to constrain the binary mask to describe edge pixels and non-edge pixels as a binary, two-class classification.

3. A method as set forth in claim 2, wherein the act of determining if an object of interest is present in the set of edge pixels, further comprises acts of:
   cropping out a region of interest window centered around a selected edge pixel;
   performing an edge preserving non-linear diffusion on the region of interest window to increase saliency of edges of a potential object of interest,
   forming a background and a foreground in the region of interest window;
   segmenting the background from the foreground;
   extracting pixel information for the foreground, the pixel information having dimensional coordinates for each pixel in the foreground;
   fitting two best fit ellipsoids to the pixel information, each ellipsoid having a major and minor axis, the two best fit ellipsoids being fit to the pixel information such that there exists an intersection between the major axis of the two ellipsoids;
   extracting the two major axes from the two ellipsoids;
   aligning the two major axes with the a known two-axis model representing an object of interest;

determining a distance measurement between the two major axes and the known two-axis model; and identifying the object as an object of interest if the distance measurement is below a predetermined threshold.

4. A method as set forth in claim 1, wherein the act of determining if an object of interest is present in the set of edge pixels, further comprises acts of:

cropping out a region of interest window centered around a selected edge pixel;

performing an edge preserving non-linear diffusion on the region of interest window to increase saliency of edges of a potential object of interest, forming a background and a foreground in the region of interest window;

segmenting the background from the foreground;

extracting pixel information for the foreground, the pixel information having dimensional coordinates for each pixel in the foreground;

fitting two best fit ellipsoids to the pixel information, each ellipsoid having a major and minor axis, the two best fit ellipsoids being fit to the pixel information such that there exists an intersection between the major axis of the two ellipsoids;

extracting the two major axes from the two ellipsoids;

aligning the two major axes with the a known two-axis model representing, an object of interest;

determining a distance measurement between the two major axes and the known two-axis model; and identifying the object as an object of interest if the distance measurement is below a predetermined threshold.

5. A computer program product for identifying a concealed object of interest, the computer program product comprising computer-readable instruction means stored on a non-transitory computer-readable medium that are executable by a computer thr causing the computer to perform operations of:

receiving an image in grayscale;

processing the image to identify feature rich regions which are identified as a binary mask describing edge pixels and non-edge pixels;

randomly sampling, a set of edge pixels; and determining if an object of interest is present in the set of edge pixels.

6. A computer program product as set forth in claim 5, wherein the operation of processing the image further comprises acts of:

identifying all edges in the image using an edge detector, which results in a binary image; and using a threshold to constrain the binary mask to describe edge pixels and non-edge pixels as a binary, two-class classification.

7. A computer program product as set forth in claim 6, wherein the operation of determining if an object of interest is present in the set of edge pixels, further comprises operations of:

cropping out a region of interest window centered around a selected edge pixel;

performing an edge preserving non-linear diffusion on the region of interest window to increase saliency of edges of a potential object of interest, forming a background and a foreground in the region of interest window;

segmenting the background from the foreground;

extracting pixel information for the foreground, the pixel information having dimensional coordinates for each pixel in the foreground;

fitting two best fit ellipsoids to the pixel information, each ellipsoid having a major and minor axis, the two best fit ellipsoids being fit to the pixel information such that there exists an intersection between the major axis of the two ellipsoids;

extracting the two major axes from the two ellipsoids;

aligning the two major axes with the a known two-axis model representing an object of interest;

determining a distance measurement between the two major axes and the known two-axis model; and identifying the object as an object of interest if the distance measurement is below a predetermined threshold.

8. A computer program product as set forth in claim 5, wherein the operation of determining if an object of interest is present in the set of edge pixels, further comprises operations of:

cropping out a region of interest window centered around a selected edge pixel;

performing an edge preserving non-linear diffusion on the region of interest window to increase saliency of edges of a potential object of interest, forming a background and a foreground in the region of interest window;

segmenting the background from the foreground;

extracting pixel information for the foreground, the pixel information having dimensional coordinates for each pixel in the foreground;

fitting two best fit ellipsoids to the pixel information, each ellipsoid having a major and minor axis, the two best fit ellipsoids being fit to the pixel information such that there exists an intersection between the major axis of the two ellipsoids;

extracting the two major axes from the two ellipsoids;

aligning the two major axes with the a known two-axis model representing an object of interest;

determining a distance measurement between the two major axes and the known two-axis model; and identifying the object as an object of interest if the distance measurement is below a predetermined threshold.

9. A system for identifying a concealed object of interest, the system comprising a memory module and a processor, wherein the memory module is encoded with instruction means that are executable by the processor for causing the processor to perform operations of:

receiving an image in grayscale;

processing the image to identify feature rich regions which are identified as a binary mask describing edge pixels and non-edge pixels;

randomly sampling a set of edge pixels; and determine if an object of interest is present in the set of edge pixels.

10. A system as set forth in claim 9, wherein the operation of processing the image further comprises acts of:

identifying all edges in the image using an edge detector, which results in a binary image; and using a threshold to constrain the binary mask to describe edge pixels and non-edge pixels as a binary, two-class classification.

11. A system as set forth in claim 10, wherein the operation of determining if an object of interest is present in the set of edge pixels, further comprises operations of:

cropping out a region of interest window centered around a selected edge pixel;

performing an edge preserving non-linear diffusion on the region of interest window to increase saliency of edges of a potential object of interest, forming a background and a foreground in the region of interest window;

segmenting the background from the foreground;

extracting pixel information for the foreground, the pixel information having dimensional coordinates for each pixel in the foreground;

fitting two best fit ellipsoids to the pixel information, each ellipsoid having a major and minor axis, the two best fit ellipsoids being fit to the pixel information such that there exists an intersection between the major axis of the two ellipsoids;

extracting the two major axes from the two ellipsoids;

aligning the two major axes with the a known two-axis model representing an object of interest;

determining a distance measurement between the two major axes and the known two-axis model; and identifying the object as an object of interest if the distance measurement is below a predetermined threshold.

12. A system as set forth in claim 9, wherein the operation of determining if an object of interest is present in the set of edge pixels, further comprises operations of:

cropping out a region of interest window centered around a selected edge pixel;

performing an edge preserving non-linear diffusion on the region of interest window to increase saliency of edges of a potential object of interest, forming, a background and a foreground in the region of interest window;

segmenting the background from the foreground;

extracting pixel information for the foreground, the pixel information having dimensional coordinates for each pixel in the foreground;

fitting two best fit ellipsoids to the pixel information, each ellipsoid having a major and minor axis, the two best fit ellipsoids being fit to the pixel information such that there exists an intersection between the major axis of the two ellipsoids;

extracting the two major axes from the two ellipsoids;

aligning the two major axes with the a known two-axis model representing an object of interest;

determining, a distance measurement between the two major axes and the known two-axis model; and identifying the object as an object of interest if the distance measurement is below a predetermined threshold.

* * * * *